United States Patent [19] [11] Patent Number: 4,529,793
Abe et al. [45] Date of Patent: Jul. 16, 1985

[54] SELECTIVE PERMEABLE MEMBRANES COMPRISING A POLYQUINAZOLONE-BASED POLYMER

[75] Inventors: Masao Abe; Akio Iwama; Yuzuru Noda; Hisashi Ichinose, all of Osaka, Japan

[73] Assignee: Nitto Electric Industrial Co., Ltd., Osaka, Japan

[21] Appl. No.: 505,635

[22] Filed: Jun. 20, 1983

Related U.S. Application Data

[62] Division of Ser. No. 195,175, Oct. 9, 1980, abandoned.

[30] Foreign Application Priority Data

Oct. 9, 1979 [JP] Japan ................................. 54-130214

[51] Int. Cl.$^3$ ............................................. C08G 73/06
[52] U.S. Cl. ................................. 528/423; 210/500.2;
528/27; 528/172; 528/208; 528/210; 528/211;
528/229; 528/321; 528/327; 528/331; 528/337;
528/341; 528/391
[58] Field of Search ............... 528/423, 210, 211, 229,
528/27, 331, 327, 321, 337, 391, 341, 172, 208;
210/500.2

[56] References Cited

U.S. PATENT DOCUMENTS 4,354,017  10/1982  Abe et al. ............................ 528/327

Primary Examiner—Harold D. Anderson
Attorney, Agent, or Firm—Sughrue, Mion, Zinn, Macpeak & Seas

[57] ABSTRACT

A selective permeable membrane comprising a polyquinazolone-based polymer including a repeating unit represented by the formula

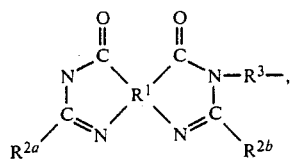

wherein $R^1$ is a tetravalent aromatic group, $R^{2a}$ and $R^{2b}$ are each independently, an alkyl group or aromatic group, and $R^3$ is a divalent organic group.

7 Claims, 2 Drawing Figures

SELECTIVE PERMEABLE MEMBRANES COMPRISING A POLYQUINAZOLONE-BASED POLYMER

This is a division of application Ser. No. 195,175 filed Oct. 9, 1980 now abandoned.

BACKGROUND OF THE INVENTION

1. Field of the Invention

This invention relates to selective permeable membranes made from polyquinazolone-based polymers.

2. Description of the Prior Art

In general, the term "selective permeable membrane" designates those membranes which prevent specific components contained in a liquid mixture, such as a solution or emulsion, from passing therethrough, and these membranes are generally anisotropic membranes having a structure wherein a surface layer containing dense and fine pores, i.e., skin layer is supported by a porous layer.

Typical examples of such membranes are a reverse osmosis membrane and an ultrafiltration membrane. The reverse osmosis membrane is, as is well known in the art, able to separate water from an aqueous solution containing relatively low molecular weight compounds, as well as salts such as sodium chloride, and is used to desalt sea water and brine, treating waste water from industrial plants and in purifying sewage. The ultrafiltration membrane, on the other hand, is capable of separating, from a solution or dispersion containing substances of large particle size, such as colloids, proteins, microorganisms, etc., and high polymeric substances, the solvent or dispersing agent used in the solution or dispersion, and is, therefore, used in the purification and concentration steps involved in the manufacture of foods and medicines, as well as in the brewing and fermentation industries.

Heretofore, as a material for preparing a selective permeable membrane of the above type, cellulose acetate has typically been used. This cellulose acetate membrane, when used as a reverse osmosis membrane for aqueous solutions, is excellent in its water permeation rate and efficiency of preventing specific solutes from passing therethrough, but is not completely satisfactory in heat resistance, pH resistance, chemical resistance, bacteria resistance, etc.

In order to overcome the above problems of the cellulose acetate membrane, selective permeable membranes made from polymers such as polysulfone, aromatic polyamide, polyimide, polyamidoimide, polyamidohydrazide, etc. have been proposed. With these selective permeable membranes, the above problems are solved to a certain extent, but they suffer from other disadvantages, such as that they are significantly inferior in permeation characteristics compared to the cellulose acetate membrane and that they are insufficient in chlorine resistance.

For example, an ultrafiltration membrane made from polysulfone is excellent in pH resistance and heat resistance, but shows very poor resistance to organic solvents. Further, the polysulfone is too hydrophobic so that it is difficult to form a reverse osmosis membrane. Selective permeable membranes made from aromatic polyamide, polyamidoimide, and polyamidohydrazide show improved pH resistance, bacteria resistance, etc., but are inferior in chlorine resistance and in general, they do not have sufficiently great permeability and are limited in practical usefullness. Furthermore, an aromatic polyimide membrane which has heretofore been proposed is not sufficient in alkali resistance and in general, not sufficient in permiability although it has excellent heat resistance. Additionally, for the production thereof, complicated and numerous steps are required. Thus, the aromatic polyimide membrane is of low practical value from the view point of both performance and cost.

Thus the heretofore proposed selective permeable membranes made from various polymers are, as described above, not entirely satisfactory in several respects.

Recently, a selective permeable membrane made from a polyquinazolone, in which quinazolone rings are connected by the carbon-carbon bond at the 2-position, -polyamide copolymer has been proposed as having excellent membrane characteristics. See Japanese Patent Application (OPI) No. 72777/1979 (the term "OPI" as used herein refers to a "published unexamined Japanese patent application"). However, this membrane is a copolymer containing polyamide and is therefore not sufficient in chlorine resistance.

SUMMARY OF THE INVENTION

An object of this invention is to provide a selective permeable membrane from a polyquinazolone-based polymer.

Another object of this invention is to provide a novel polyquinazolone-based polymer containing a hydrophilic group or groups.

It has now been found according to this invention that a selective permeable membrane made from a polyquinazolone-based polymer in which quinazolone rings are connected through the nitrogen at the 3-position (and not by the carbon-carbon bond) is excellent particularly in chlorine resistance and alkali resistance, exhibits high resistance against various organic solvents and chemicals, and it can be easily produced.

Therefore a selective permeable membrane according to this invention comprising a polyquinazolone-based polymer including a repeating unit (Ia) represented by the formula

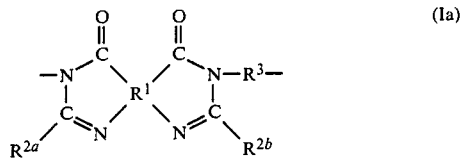

wherein $R^1$ is a tetravalent aromatic group, $R^{2a}$ and $R^{2b}$ are each independently an alkyl group or an aromatic group, and $R^3$ is a divalent organic group.

In another aspect, a selective permeable membrane of this invention comprises a polyquinazolone-based polymer having repeating units of the above bisquinazolone repeating unit (Ia) and a repeating unit (Ib) represented by the formula

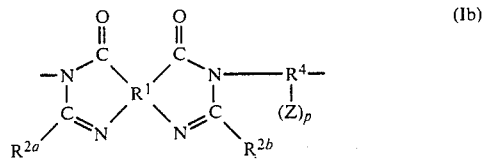

wherein $R^1$, $R^{2a}$ and $R^{2b}$ are the same as defined above, $R^4$ is an aromatic group having a (p+2) valency, each Z is independently selected from the group consisting of —COOH, —SO$_3$H, and metal salts thereof, and p is an integer of 1 to 4.

DETAILED DESCRIPTION OF THE INVENTION

Figure 1:
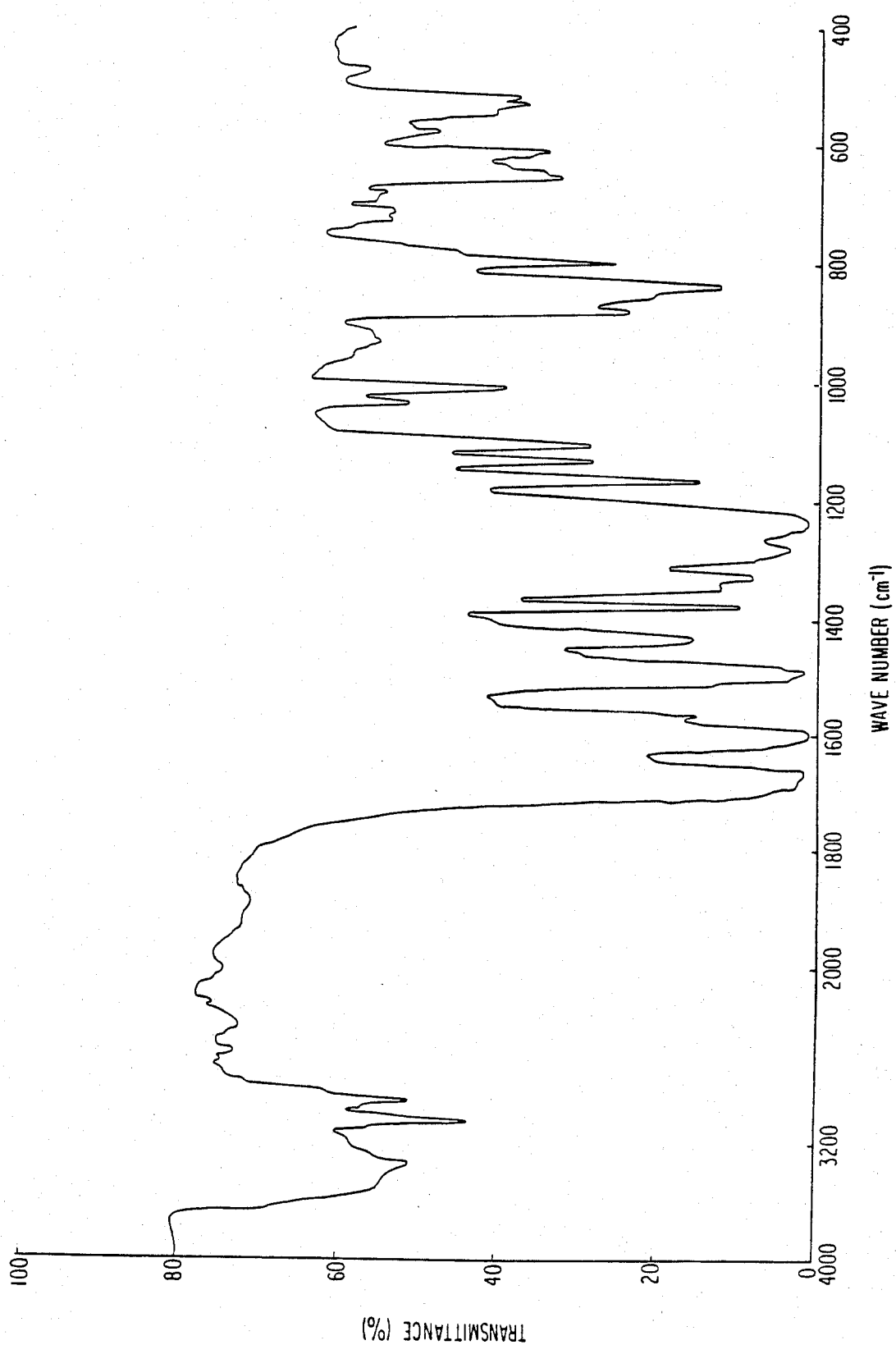
FIGS. 1 and 2 show infrared absorption spectra of polyquinazolone-based polymers obtained, respectively, in Examples 1 and 10.

The term "unit (I)" as hereinafter used includes both the units (Ia) and (Ib).

In the polyquinazolone-based polymer represented by the formula (I), $R^1$ is a tetravalent aromatic group, and preferred $R^1$ groups are

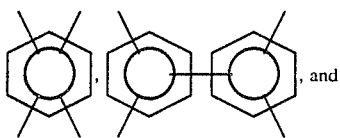, and

X is a divalent organic linking group which bonds together two aromatic groups to form a tetravalent aromatic group. Representative examples of X include

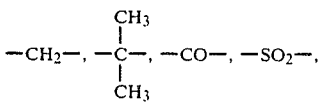

—NH—, —COO—, —CONH—, etc.

$R^{2a}$ and $R^{2b}$ can each be an alkyl group or an aromatic group, preferably an alkyl group having 1 to 4 carbon atoms, and especially preferably a methyl group or a phenyl group. Although two $R^3$s are bonded together in the above repeating unit, they are not necessarily required to be the same.

$R^3$ is a divalent organic group and in more detail, a divalent aromatic, aliphatic or alicyclic organic group, or a divalent organic group in which the above groups are bonded together by an organic linking group Y. Representative examples of Y include

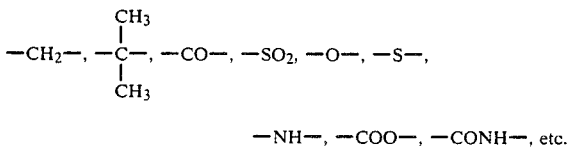

—O—, —NH—, —S—, —CONH—, —COO—,

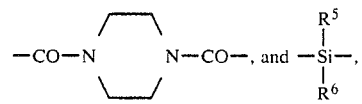

wherein $R^5$ and $R^6$ are each independently an alkyl group having from 1 to 10 carbon atoms, a cycloalkyl group having from 3 to 10 carbon atoms, or a phenyl group.

$R^3$ is preferably an aromatic group, and representative examples are selected from the groups represented by the formulae

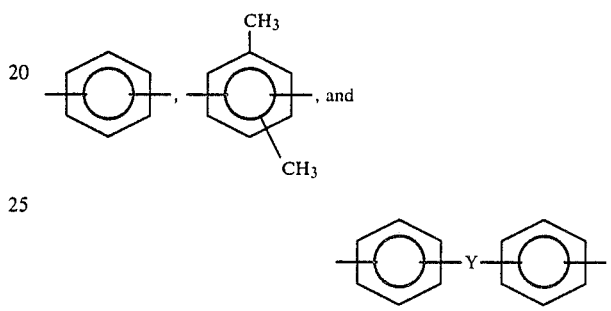

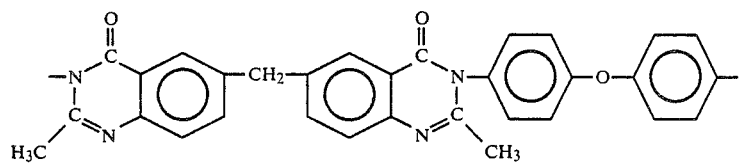

wherein Y is the same as defined above.

Accordingly, a preferred example of repeating unit (Ia) is

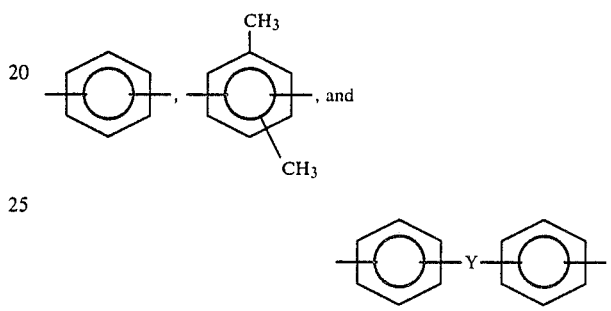

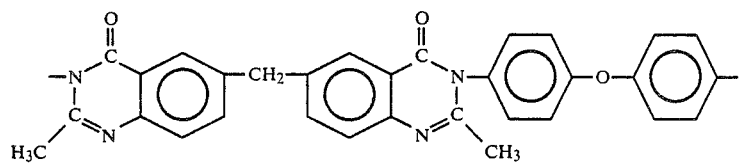

The polyquinazolone-based polymer having a repeating unit (Ia) can be obtained by reacting the compound represented by the formula

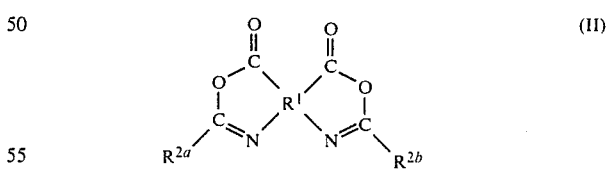 (II)

wherein $R^1$, $R^{2a}$ and $R^{2b}$ are the same as defined above, and

H$_2$N—R$^3$—NH$_2$ (III)

wherein $R^3$ is the same as defined above, in an amount of from about 0.95 to 1.08 mol, and preferably about 1 mol, per mol of the compound of formula (II), in an organic solvent under heating.

Examples of bisoxazinones represented by Formula (II) which are preferably used in this invention include

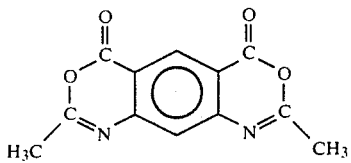
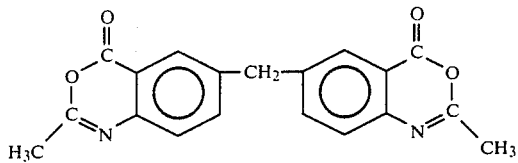
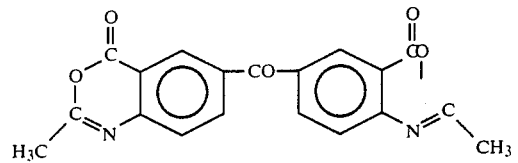
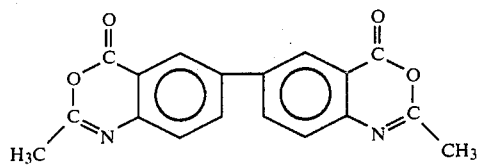
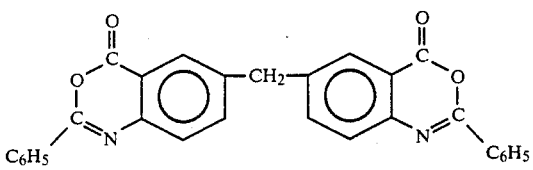

$R^3$ in the diamine represented by the formula (III) is the same as defined above. Representative examples thereof include m-phenylenediamine, p-phenylenediamine, 4,4′-diaminodiphenylmethane, 4,4′-diamino diphenyl ether, 3,4′-diamino diphenyl ether, 4,4′-diaminodiphenylsulfide, 4,4′-diaminodiphenylsulfone, p-bis(4-aminophenoxy)benzene, m-bis(4-aminophenoxy)benzene, N,N′-piperazine-bis-(p-aminobenzimide), m-xylilenediamine, p-xylilenediamine, bis(4-aminocyclohexyl)methane, hexamethylenediamine, heptamethylenediamine, octamethylenediamine, 1,4,-diaminocyclohexane, bis(4-aminophenyl)diethylsilane, etc. These diamines can be used alone or in mixtures thereof.

A method of preparing the above compounds of formula (II) is already known, as described, for example, in J. Polymer Sci., Vol. 60, S 59 (1962) and Kogyo Kagaku Zashi, Vol. 73, P. 1230 (1970). Usually it is prepared by reacting aromatic diaminodicarboxylic acid represented by the formula

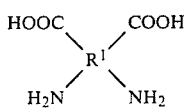

wherein $R^1$ is the same as described above, with aliphatic carboxylic anhydride represented by the formula

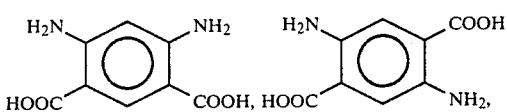

wherein $R^{2a}$ and $R^{2b}$ are the same as described above, or with aromatic carboxylic acid chloride represented by the formula $$R^{2a}-CO-Cl$$

wherein $R^2$ is the same as described above.

Usually, the following compounds are used as the aromatic diaminodicarboxylic acid:

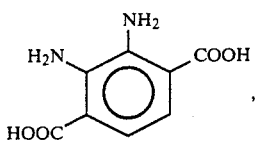

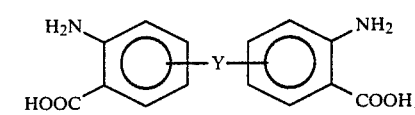

wherein Y is the same as described above. As the acid anhydride, acetic anhydride, etc., can be used, and as the acid chloride, benzoyl chloride, etc., can be used.

Condensation of the compounds of formula (II) and diamine (III) can be carried out by heating in a solvent. As the solvent, those solvents are used which are capable of dissolving a compound of formula (II) and diamine while at the same time being inert thereto, and furthermore which are able to dissolve the polyquinazolone-based polymer formed and to maintain the reaction system in an acidic state. Examples of preferred solvents include cresols such as p-cresol, m-cresol, etc., chlorophenols such as p-chlorophenol, o-chlorophenol, etc., polyphosphoric acid and sulfuric acid. These solvents can be used alone or in mixtures thereof. If necessary, mixed solvents of the above-described solvents and non-polar hydrocarbon solvents such as benzene, toluene, xylene, chlorobenzene, naphtha, etc. are used.

While the amount of the solvent used based on the starting materials is subject to no special limitations, it is preferably from 60 to 900 parts by weight per 100 parts by weight of the total weight of a compound of formula (II) and diamine. The reaction temperature and reaction time vary according to the types of the starting materials and solvent, but a compound of formula (II) and diamine are preferably reacted at a temperature of from 100° C. to 300° C. for from 5 to 50 hours.

The polyquinazolone-based polymer including the units (Ia) and (Ib) as repeating units is novel. This polymer can be similarly obtained by replacing a part of the diamine (III) by a diamine having a hydrophilic group or Z groups; that is, bisoxazinone represented by the formula (II), diamine represented by the formula (III) and diamine (IV) represented by the formula (IV)

wherein $R^4$, Z and p are the same as described above, are reacted under heating in the solvent as described above under conditions such that the total amount of the diamines is typically from 0.95 to 1.08 mol, and preferably about 1 mol, per mol of a compound of formula (II). The reaction conditions can be the same as described above.

$R^4$, Z and p in the aromatic diamine represented by the formula (IV) are the same as described above. Examples of such diamines include, 3,5-diaminobenzoic acid, 4,4'-diaminodiphenylmethane-3,3'-dicarboxylic acid, 3,5-diaminobenzenesulfonic acid, 3,3'-benzidinedicarboxylic acid, N,N'-bis(p-aminobenzoyl)-3,5-diaminobenzoic acid, isophthal-3-amino-5-carboxyanilide, 3,3'-benzidinedisulfonic acid, 4,4'-diaminodiphenylmethane-3,3'-disulfonic acid, etc.

In this invention, the polyquinazolone-based polymer including the repeating unit (I) preferably has an inherent viscosity of from 0.40 to 1.50, and more preferably from 0.5 to 1.0. If the inherent viscosity is too small, a selective permeable membrane having poor self-supporting properties and insufficient mechanical strength is obtained. On the other hand, if it is too large, it is difficult to obtain a uniform dope (film-forming liquor), and the formation of film is difficult.

The selective permeable membrane of this invention can be prepared by various methods. In general, the polyquinazolone-based polymer and an additive as will be explained later are dissolved in a solvent to form a uniform dope. The resulting uniform dope is then flow-coated onto a suitable supporting substrate, and, if necessary, after forced evaporation of a part of the solvent by heating, the substrate coated with the dope is immersed in a coagulating solvent to coagulate the polymer and form a film. Alternatively, as described in Japanese Patent Application No. 139383/1977, a supporting substrate on which a dope has been flow-coated is, if necessary after heat treatment, immersed in a predetermined organic solvent and further in a coagulating solvent to form a film.

Any polyquinazolone-based polymers as described above can be used to prepare selective permeable membranes according to the method of this invention. Of these polyquinazolone-based polymers, however, preferably those polymers are used in which $R^{2a}$ and $R^{2b}$ of the formula (I) are an aromatic group, particularly an aromatic group wherein two or more aromatic groups are linked with each another by at least one hydrophilic group, e.g., $-O-$, $-SO_2-$, $-CO-$, etc. When $R^{2a}$ and $R^{2b}$ contain an aromatic group, the selective permeable membrane finally obtained is excellent in selective separation capability at high temperatures. Moreover, when $R^{2a}$ and $R^{2b}$ contain a hydrophilic group, the selective permeable membrane obtained has a high water permeation rate.

In comparison with the selective permeable membrane made from the polyquinazolone-based polymer containing only the repeating unit (Ia), the selective permeable membrane made from the polyquinazolone-based polymer including both the units (Ia) and (Ib) has higher selective permeability and greater water permeation rate while holding excellent physical properties.

However, if the unit (Ib) content is excessively high, the practical strength of the obtained permeable membrane will lower. Usually, therefore, the unit (Ib) constitutes 70 mol % or less, preferably 5 mol % to 60 mol % of the total of the units (Ia) and (Ib).

In general, introduction of hydrophilic groups in polymer chains increases the water permeation rate of the permeable membrane, but tends to lower the selective permeability. However, the introduction of carboxyl and sulfonic acid hydrophilic groups into the polymer chain according to this invention enables to increase the water permeation rate while maintaining the selective permeability at a high level.

Hereinafter, a process for preparing selective permeable membrane according to this invention will be explained in more detail.

The solvent (dope solvent) for forming a dope preferably has an ability to dissolve the polyquinazolone-based polymer and additives, and miscibility with a coagulating solvent, as will be explained later. Preferred examples of such dope solvents include N-methyl-2-pyrrolidone, N-methyl-2-piperidone, dimethylacetoamide, dimethylformamide and mixtures thereof.

The dope as used in this invention preferably contains additives. Additives which can be used in this invention include halides (particularly chlorides and bromides), nitrates, sulfates, and perchlorates of alkali and alkaline earth metals (particularly lithium, sodium, potassium and magnesium), and mixtures thereof. Preferred examples are lithium nitrate, potassium nitrate, lithium chloride, potassium chloride, calcium chloride, calcium nitrate, calcium sulfate, lithium bromide, and potassium bromide.

The above-described inorganic additive is usually added in an amount of from 5 to 200 parts by weight, and preferably from 10 to 120 parts by weight based on 100 parts by weight of the polyquinazolone-based polymer. The use of the additive in greater amounts than 200 parts by weight tends to inhibit the uniformity of the dope, making it difficult to obtain a uniform permeable membrane. On the other hand, in amounts of less than 5 parts by weight, there is a tendency that the permeable membrane obtained will not have sufficiently high water permeation rate.

Additionally, polyhydric alcohols and their ether derivatives are also preferably used as additives. Examples of such additives include (poly)ethylene glycols and their lower alkyl ethers, such as ethylene glycol, diethylene glycol, triethylene glycol, ethylene glycol monomethyl ether, ethylene glycol monoethyl ether, ethylene glycol dimethyl ether, diethylene glycol monomethyl ether, diethylene glycol dimethyl ether, triethylene glycol monomethyl ether, etc., and polyhydric alcohols such as glycerine, 1,3-propanediol, 1,3-butanediol, 1,4-butanediol, 2,3-butanedio, 1,2,3,4-butanetetraol, pentaerythritol, xylitol, sorbitol, etc.

The amount of the organic additive added is usually from 5 to 250 parts by weight, and preferably from 10 to 160 parts by weight, per 100 parts by weight of the polyquinazolone-based polymer. If desired, the organic additive may be used in combination with the inorganic additive.

The dope concentration (i.e., the concentration of solids in the dope) in this invention is usually from 5 to 30% by weight, and preferably from 15 to 25% by weight. When the dope concentration is too low, the obtained permeable membrane is inferior in selective separation ability. On the other hand, when the dope concentration is too large, the permeable membrane obtained is small in the permeation rate, which is not desirable from practical standpoint. The viscosity of the dope is generally adjusted to from 10 to 1,000 poises, and preferably from 50 to 500 poises at the time of coating on a supporting substrate, although it can be varied according to the dope concentration.

The supporting substrate on which the dope is coated is subject to no special limitations. When a plate or tube member having a smooth surface, made from such a material as glass, stainless steel, aluminum, polyethylene, polypropylene or the like, is used as a supporting substrate, the polyquinazolone-based polymer can easily be stripped from the substrate after the coagulation thereof and a corresponding sheet- or tube-like selective permeable membrane is thus obtained. Additionally, fabrics, unwoven sheet members and tube members of organic fibers such as polyester, acryl and like fibers, or inorganic fibers such as glass, carbon and like fibers can be used as supporting substrates. Film-making by coating the dope on such a supporting substrate provides a composite permeable membrane in which the obtained film is bonded together with the substrate.

The dope is coated on the supporting substrate, usually in such a manner that the thickness of the permeable membrane obtained is from 50 to 400 $\mu$, and preferably from 100 to 200 $\mu$, although it can be varied according to the application and type of the selective permeable membrane desired. When the film thickness is too small, the permeable membrane obtained is inferior in mechanical strength. On the other hand, when the film thickness is too large, the permeable membrane obtained is increased in selective separation capability, but the water permeation rate is lowered. Such poor mechanical strength and low water permeation rates are not desirable from a practical standpoint.

By changing the processing after the coating of the dope, various permeable membranes, ranging from a reverse osmosis membrane to an ultrafiltration membrane and a fine filtration membrane, can be obtained. For example, in producing the reverse osmosis membrane, the dope is coated on the substrate and then heat-treated to forcedly evaporate a part of the dope solvent from the dope surface layer. This heat-treatment is carried out within limits such that the dope solvent does not boil, and usually is performed by sending hot air on the dope surface. This is because if the dope solvent boils, air bubbles are undesirably formed in the permeable membrane obtained. The heat-treatment forms in the dope surface layer a super-thin layer having a high polyquinazolone-based polymer concentration. This super-thin layer, after coagulation, forms a so-called skin layer suitable for reverse osmosis. The heat-treatment temperature and time, therefore, are selected such as to provide such a super-thin layer. For example, hot air of a temperature of from 50° C. to 200° C. is sent on the dope surface for 1 to 15 minutes to form the super-thin layer.

After the coating of the dope on the substrate, the above heat-treatment is usually started within 5 minutes (due to normal operational limitations), but it may be started 1 to 2 hours later. It is however, not desirable to carry out the heat-treatment after the dope surface has been allowed to stand for a long period of time, because the dope on the substrate becomes cloudy on absorbing water in the air and a permeable membrane having uniform physical properties and high selective separation capability can not be formed uniformly over the surface of the membrane.

After the above heat-treatment, the dope-coated supporting substrate is preferably immediately immersed in a coagulating solvent to coagulate the polyquinazolone-based polymer. It is, therefore, required for the coagulating solvent that it does not dissolve the polyquinazolone-based polymer, but has a good mutual solubility with the dope solvent, preferably is mutually soluble with the dope solvent in any proportions and furthermore that it can dissolve the above-described additives. Typically water is used. Other coagulating solvents include mixed solvents of organic solvents mutually soluble with water and water. Examples of such organic solvents include acetone, methanol, ethanol, propanol, ethylene glycol, diethylene glycol, ethylene glycol monomethyl ether, etc. The organic solvent content of the mixed solvent is usually 10% by weight or less. If desired, these organic solvents can be used singly as a coagulating solvent.

The temperature at which the polyquinazolone-based polymer is coagulated by immersing in the coagulating solvent to form a film is generally below the boiling point of the coagulating solvent. Where the coagulating solvent is water, the temperature is usually from 0° C. to 80° C., and preferably from 0° C. to 50° C. The coagulating time is not critical and usually can be from 1 hour to 10 hours.

In producing the ultrafiltration membrane and fine filtration membrane, the above-described heat-treatment may usually be omitted. The dope-coated supporting substrate, therefore, is preferably immediately immersed in the coagulating solvent. Although the dope-coated supporting substrate may be immersed in the coagulating solvent after 1 to 2 hours from the time of the coating, it is not desirable for the above-described reasons to allow the dope-coated substrate to stand for a long period of time. The temperature and time at the coagulation are as described above.

For the production of the selectively permeable membrane from the polyquinazolone-based polymer, the method as disclosed in Japanese Patent Application (OPI) No. 71785/1979 can be used. That is, the dope-coated supporting substrate is immersed for a short period of time in an organic solvent, which does not dissolve the polyquinazolone-based polymer, but does dissolve the additives, and which has good mutual solubility with both the dope solvent and water (hereinafter, referred to as "an immersing solvent"). Subsequently, the substrate is immersed in water as a coagulating solvent.

The dope-coated supporting substrate is immersed in the immersing solvent, as described above, before the dope becomes cloudy by absorbing water in the air. Usually, the dope-coated supporting substrate is immersed in the immersing solvent within a period of 5 minutes from the coating of the dope. The temperature at which the dope-coated supporting substrate is immersed in the immersing solvent is below the boiling point of the immersing solvent, and is usually from 0° C. to 150° C., and preferably from 10° C. to 80° C. The immersing time is usually from 0.5 to 600 seconds, and preferably from 1 to 120 seconds, although it varies according to the type of immersing solvent and the immersing temperature used.

Immersing solvents which can be used in this invention include methanol, ethanol, i-propanol, tert-butanol, ethylene glycol, propylene glycol, glycerine, acetone, tetrahydrofuran, dioxane, methyl cellosolve, ethyl cellosolve, etc. Of course, the optimum immersing solvent is selected taking into consideration the dope solvent used. For example, where the dope solvent is N-methyl-2-pyrrolidone, tetrahydrofuran, acetone, tert-butanol, ethylene glycol, etc. are preferably used.

The supporting substrate taken out of the immersing solvent is then, preferably immediately, immersed in water. It is preferred to immerse in the immersing solvent within 5 minutes after the substrate is taken out. It is sufficient to carry out the immersing in water at a temperature of from 0° C. to 80° C. for a period of from 1 hour to 10 hours.

By the above-described method in which the immersing solvent is used, a selectively permeable membrane can be obtained which is suitable as a reverse osmosis membrane or an ultrafiltration membrane. By carrying out heat-treatment under the above-described conditions before the immersing of the substrate in the immersing solvent, the selective separation capability of the obtained selective permeable membrane can be further increased.

The following examples are given to illustrate this invention in greater detail. This invention, however, is not limited thereby.

Example A—Production of Polyquinazolone Having Unit (Ia) as Repeating Unit, Formation of Membrane, and Evaluation of Membrane Performance

EXAMPLE 1

Preparation of Polyquinazolone

A flask equipped with a stirrer, an inlet for nitrogen gas, a reflux column with a device for draining the reaction water, and a jacket which could be heated to 250° C. was charged with 128 g of p-chlorophenol, 20.1 g (0.060 mol) of bisoxazine having the following structure:

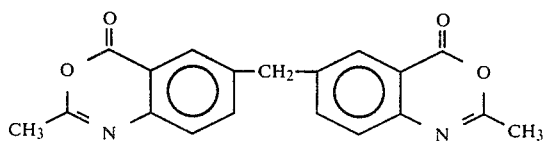

and 12.0 g (0.060 mol) of 4,4'-diamino diphenyl ether to obtain a solution. Then, 50 ml of xylene was added thereto as an azeotropic solvent, and the resulting mixture was heated at a temperature of from 175° C. to 195° C. in a stream of nitrogen under reflux of xylene while continuously removing the reaction water by azeotropic distillation to thereby perform the condensation polymerization reaction.

The reaction was continued for 4 hours and then cooled, and the thus-obtained viscous polyquinazolone solution was placed in acetone in the amount of as much as about 20 times that of the polyquinazolone solution to precipitate the polyquinazolone. This polyquinazolone was filtered off and vacuum-dried at a temperature of 60° C., to obtain 27.0 g of powdery polyquinazolone.

The polyquinazolone had an inherent viscosity of 0.87 and consisted essentially of the following repeating unit:

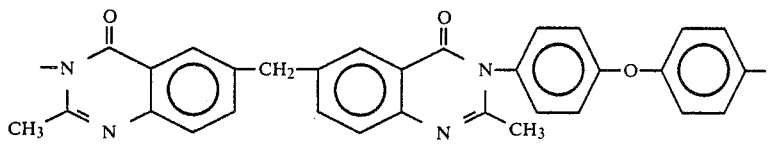

The infrared spectrum of the polyquinazolone is shown in FIG. 1.

EXAMPLE 2

Preparation of Polyquinazolone

In the same manner as in Example 1 except that 11.9 g (0.060 mol) of 4,4'-diaminodiphenylmethane was used in place of the 4,4'-diaminodiphenyl ether, 25.5 g of powdery polyquinazolone having an inherent viscosity of 0.71 was obtained. This polyquinazolone consisted essentially of the following repeating unit:

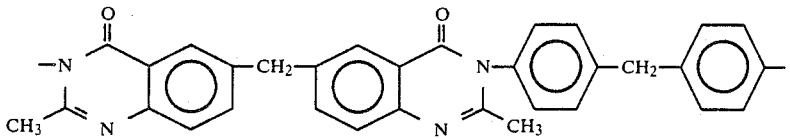

EXAMPLE 3

Preparation of Polyquinazolone

In the same manner as in Example 1 except that a mixture of 9.61 g (0.048 mol) of 4,4'-diamino diphenyl ether and 3.89 g (0.012 mol) of piperazinebis(p-aminobenzoic acidamide) was used in place of 12.0 g of 4,4'-diamino diphenyl ether, 27.6 g of powdery polyquinazolone having an inherent viscosity of 0.68 was obtained. This polyquinazolone consisted essentially of the following two kinds of repeating units:

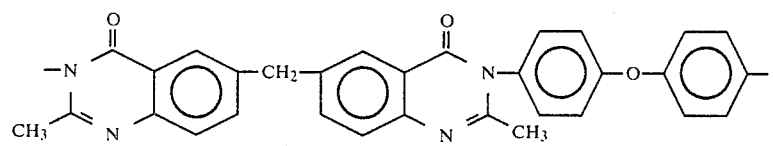

-continued

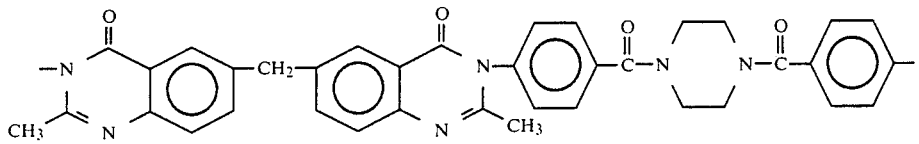

EXAMPLE 4

Preparation of Dope (1) In 65.3 g of N,N-dimethylformamide was dissolved 15.0 g of the polyquinazolone as obtained in Example 1. Then, 15.0 g of lithium nitrate which had been finely pulverized in a mortar was added to the above prepared polyquinazolone solution and stirred at 90° C. for 6 hours to obtain a uniform dope. This dope is designated as Dope A.

(2) In 80.0 g of N-methylpyrroldine was dissolved 16.0 g of the polyquinazolone as obtained in Example 1. Diethylene glycol was added to the above-prepared solution so that the amount of diethylene glycol was 120 parts by weight per 100 parts by weight of polyquinazolone, and the resulting mixture was stirred at a temperature of 90° C. for 3 hours to obtain a uniform dope. This dope is designated a Dope B.

(3) In the same manner as in (1), Dopes D and F were obtained, and in the same manner as in (2), Does C and E. The compositions of these dopes are shown in Table 1 together with those of Dopes A and B.

TABLE 1

| Dope | Polyquinazolone | Additive | Amount of Additive per 100 Parts by Weight of Polyquinazolone (parts by weight) |
|---|---|---|---|
| A | Example 1 | lithium nitrate | 100 |
| B | Example 2 | diethylene glycol | 120 |
| C | Example 1 | triethylene glycol | 80 |
| D | Example 2 | calcium nitrate | 40 |
| E | Example 1 | glycerine | 180 |
| F | Example 3 | lithium chloride | 20 |

EXAMPLE 5

Formation of Membrane and Evaluation of Membrane Performance

Hereinafter, unless otherwise indicated, the membrane performance was evaluated by the elimination efficiency and water permeating rate, represented by the following equations, measured by using as a feed solution an aqueous solution containing as a solute polyethylene glycol having an average molecular weight of about 20,000 in a concentration of 5,000 ppm.

Solute Rejection =

$$\left(1 - \frac{\text{Concentration of Solute in Permeate}}{\text{Concentration of Solute in Feed Solution}}\right) \times 100(\%)$$

Water Permeation Rate =

$$\frac{\text{Volume of Permeate (m}^3\text{)}}{\left(\text{Effective Area of Membrane (m}^2\text{)}\right) \times \left(\text{Processing Time (days)}\right)}$$

The results obtained are shown in Table 2.

In Table 2, Evaluation Method (a) refers to a method in which the sheet-like permeable membrane obtained is attached onto a pressure batch-type measuring cell and the feed solution is supplied at 25° C. and 4 kg/cm² to evaluate the membrane performance. Evaluation Method (b) refers to a method in which the tubular permeable membrane obtained is inserted into a bored stainless steel pipe and feed solution is supplied thereto at 25° C. and 4 kg/cm² to evaluate the membrane performance.

(1) Dope A was coated in a thickness of 360 μ on a glass plate and held in a horizontal state in an atmosphere of 25° C. and 65% RH and, thereafter, the Dope A-coated glass plate was immersed for 5 hours in water maintained at 0° C. to obtain a permeable membrane having a thickness of 211 μ.

(2) Dope A was flow-coated in a thickness of 400 μ on the internal surface of a glass tube having an inner diameter of 13.6 mm and an inner thickness of 3 mm, and the Dope B-coated glass tube was then immediately inserted in water maintained at 5° C. and immersed for 5 hours to obtain a tubular permeable membrane having an outer diameter of 13.1 mm and a thickness of 250 μ.

(3) Dope B was coated in a thickness of 360 μ on a glass plate and immediately heated at 130° C. for 6 seconds in an air circulation type heating oven. After the heat-treatment, the glass plate was immediately placed in water maintained at 0° C. and immersed therein for 5 hours to obtain a permeable membrane having a thickness of 194 μ.

(4) Dope C was coated in a thickness of 360 μ on a glass plate and maintained at a temperature of 25° C. for about 30 seconds and, thereafter, the Dope C-coated glass plate was immersed in water maintained at 0° C. for 5 hours to obtain a permeable membrane having a thickness of 202 μ.

(5) Dope D was flow-coated on the inner surface of a glass tube having an inner diameter of 13.6 mm and a thickness of 3 mm, and then hot air of a temperature of 130° C. was blown through the glass tube for 180 seconds to perform heat-treatment. During this heat-treatment, the glass tube was rotated at 50 r.p.m. Immediately after the blowing of the hot air was finished, the glass tube was immersed in water maintained at 0° C. for 5 hours to obtain a permeable membrane having an outer diameter of 13.1 mm and a thickness of 225 μ.

(6) Dope E was coated in a thickness of 360 μ on a glass plate, and in the same manner as in (1), a permeable membrane having a thickness of 215 μ was obtained.

For the evaluation of this permeable membrane, an aqueous solution containing as a solute dextrin having an average molecular weight of about 7,000 in a concentration of 5,000 ppm was used as a feed solution.

(7) Dope F was coated in a thickness of 360 μ on a glass plate and immediately heated at a temperature of 130° C. for 120 seconds in an air circulation type heating oven. Immediately after the heat treatment, the Dope F-coated glass plate was immersed in water maintained at 0° C. for 5 hours to obtain a permeable membrane having a thickness of 183 μ.

(8) Dope F was coated in a thickness of 360 μ on a glass plate, immediately immersed in acetone (immersing solvent) maintained at 20° C. for 10 seconds, and in 5 seconds after the glass plate was taken out of the acetone, it was immersed in water maintained at 0° C. for 5 hours to obtain a permeable membrane having a thickness of 230 μ.

The membrane performance of this permeable membrane was evaluated by using an aqueous solution containing as a solute polyethylene glycol having an average molecular weight of about 6,000 in a concentration of 5,000 ppm.

TABLE 2

| Example | Dope | Additive | Thickness (μ) | Water Permeation Rate (m³/m².day) | Solute Rejection (%) | Evaluation Method |
|---|---|---|---|---|---|---|
| 5-(1) | A | lithium nitrate | 211 | 1.98 | 98.2 | (a) |
| 5-(2) | A | lithium nitrate | 250 | 2.55 | 96.8 | (b) |
| 5-(3) | B | diethylene glycol | 194 | 1.51 | 99.3 | (a) |
| 5-(4) | C | triethylene glycol | 202 | 1.73 | 98.6 | (a) |
| 5-(5) | D | potassium nitrate | 225 | 1.62 | 98.9 | (b) |
| 5-(6) | E | glycerine | 215 | 1.67 | 99.7 | (a) |
| 5-(7) | F | lithium chloride | 183 | 1.45 | 99.4 | (a) |
| 5-(8) | F | lithium chloride | 230 | 1.59 | 95.7 | (a) |

EXAMPLE 6

Evaluation of Chlorine Resistance and Alkali Resistance

The permeable membranes obtained in Examples 5-(1), 5-(3) and 5-(7) were each immersed at a temperature of 25° C. for 24 hours in an aqueous solution of sodium hypochlorite having an effective chlorine concentration of 800 ppm and, thereafter, the water permeating rate and elimination efficiency were measured. As can be seen from the results shown in Table 3, the polyquinazolone membrane of this invention has excellent chlorine resistance; that is, even if it was immersed in the high concentrated chlorine aqueous solution, almost no reduction was observed in the membrane peformance.

The same permeable membranes as above were each immersed at a temperature of 50° C. for 7 hours in an alkaline aqueous solution which had been adjusted to pH 11 and, thereafter, the membrane performance was evaluate. For all of the permeable membranes, the membrane performance after the immersion was nearly equal to that after the immersion, and it is thus apparent that the polyquinazolone membrane of this invention has excellent alkali resistance.

TABLE 3

| Membrane | Immersion in Chlorine Liquor | | Immersion in Alkaline Aqueous Solution | |
|---|---|---|---|---|
| | Water Permeation Rate (m³/m².day) | Solute Rejection (%) | Water Permeation Rate (m³/m².day) | Solute Rejection (%) |
| 5-(1) | 1.99 | 98.1 | 1.89 | 98.0 |
| 5-(2) | 1.53 | 99.1 | 1.47 | 98.8 |
| 5-(7) | 1.43 | 99.3 | 1.44 | 99.1 |

Example B—Production of Polyquinazolone Having Repeating Units (Ia) and (Ib), Formation of Membrane, and Evaluation of Membrane Performance In the subsequent examples, unless otherwise indicated, the desalination efficiency and water permeating rate of the obtained selective permeable membrane were determined according to the equations as shown below, and based on the results obtained by supplying a 0.5% by weight aqueous solution of sodium chloride as a feed solution under the conditions of a temperature of 25° C. and an operation pressure of 42 kg/cm².

Salt Rejection =

$$\left(1 - \frac{\text{Concentration of Sodium Chloride in Permeate}}{\text{Concentration of Sodium Chloride in Feed Solution}}\right) \times 100(\%)$$

Water Permeation Rate =

$$\frac{\text{Volume of Permeate (m}^3\text{)}}{\left(\begin{array}{c}\text{Effective Area of}\\\text{Membrane (m}^2\text{)}\end{array}\right) \times \left(\begin{array}{c}\text{Processing}\\\text{Time (days)}\end{array}\right)}$$

Unless otherwise indicated, the dope used contained 18% by weight of the polyquinazolone-based polymer and an additive in the amount of 20 parts by weight per 100 parts by weight of the polyquinazolone-based polymer. In Examples 8, 9 and 12, the additive was lithium chloride; in Example 10, lithium nitrate; and in Example 11, lithium perchlorate.

EXAMPLE 8

In 85.5 g of m-cresol were dissolved 13.4 g (0.040 mol) of bisoxazinone having the following structure:

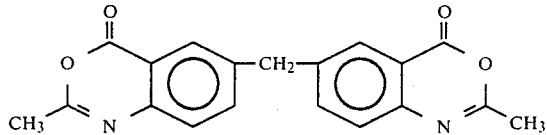

6.41 g (0.032 mol) of 4,4'-diamino diphenyl ether and 1.22 g (0.008 mol) of 3,5-diaminobenzoic acid. The resulting solution was maintained at 110° C. for 2 hours and then raised to 160° C. at which the reaction was performed for 4 hours, and viscous polyquinazolone solution was thus obtained.

This solution was diluted with m-cresol and then placed in acetone in the amount of as much as 20 times that of the solution plus the m-cresol to precipitate polyquinazolone. This polyquinazolone was filtered off and vacuum-dried at a temperature of 60° C., to obtain 18.3 g of polyquinazolone powder. The polyquinazolone consisted of 80 mol % of the repeating unit

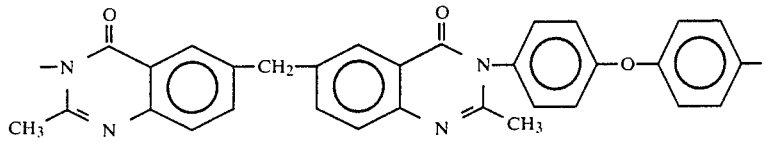

and 20 mol % of the repeating unit shown above

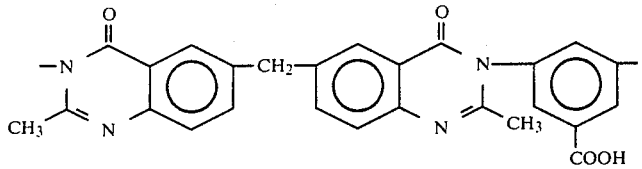

and 10 mol % of the unit

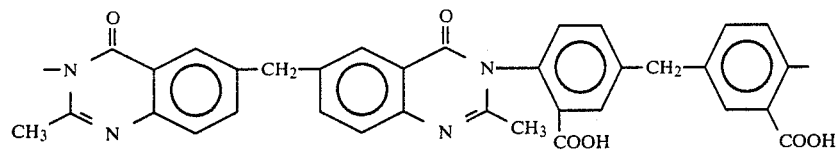

and it has an inherent viscosity of 0.82.

Then, 18.0 g of the above-prepared polyquinazolone was added to a solution consisting of 78.5 g of N-methylpyrrolidone and 3.6 g of lithium chloride and stirred at a temperature of 80° C. for 2 hours to prepare a uniform dope. This dope was allowed to stand in a temperature-controlled bath at 50° C. overnight to remove air bubbles in the dope and then coated in a thickness of 360 μ on a glass plate at a temperature of 25° C. and a relative humidity of 65%. Thereafter, the glass plate was heat-treated at 130° C. for 3 minutes in a hot air circulation type dryer and immediately immersed in water at 1° C. for 2 hours.

The permeable membrane obtained by stripping from the glass plate had a thickness of 120 μ, a salt rejection of 97.6%, and a water permeation rate of 0.53 m³/m².day.

EXAMPLE 9

In 130 g of p-chlorophenol were dissolved 20.1 g (0.06 mol) of the same compound of formula (II) as used in Example 8, 10.8 g (0.054 mol) of 4,4'-diamino diphenyl ether and 1.72 g (0.006 mol) of 4,4'-diaminodiphenylmethane-3,3'-dicarboxylic acid. In order to remove the reaction water by azeotropic distillation, 44 g of xylene was added, and the reaction was performed at a temperature of 170° C. for 4 hours, thus obtaining a viscous polyquinazolone solution. By treating in the same manner as in Example 8, 28.0 g of polyquinazolone powder was obtained.

This polyquinazolone consisted of 90 mol % of the unit

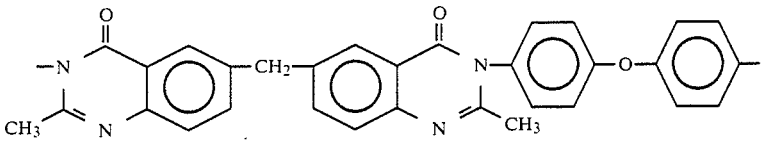

and it had an intrinsic viscosity of 0.90.

In the same manner as in Example 8, a dope was prepared from this polyquinazolone and formed into a permeable membrane. Its thickness, salt rejection, and water permeation rate were, respectively, 132 μ, 98.8% and 0.28 m³/m².day.

EXAMPLE 10

A mixture of 100 parts by mol of the same compound of formula (II) as used in Example 8, 70 parts by mol of 4,4'-diamino diphenyl ether, and 30 parts by mol of 4,4'-diaminodiphenylmethane-3,3'-dicarboxylic acid was dissolved in m-cresol and reacted in the same manner as in Example 2 to obtain polyquinazolone having an inherent viscosity of 0.67, and consisting of 70 mol % of the first bisquinazolone unit shown in Example 9 and 30 mol % of the second repeating unit.

Figure 2:
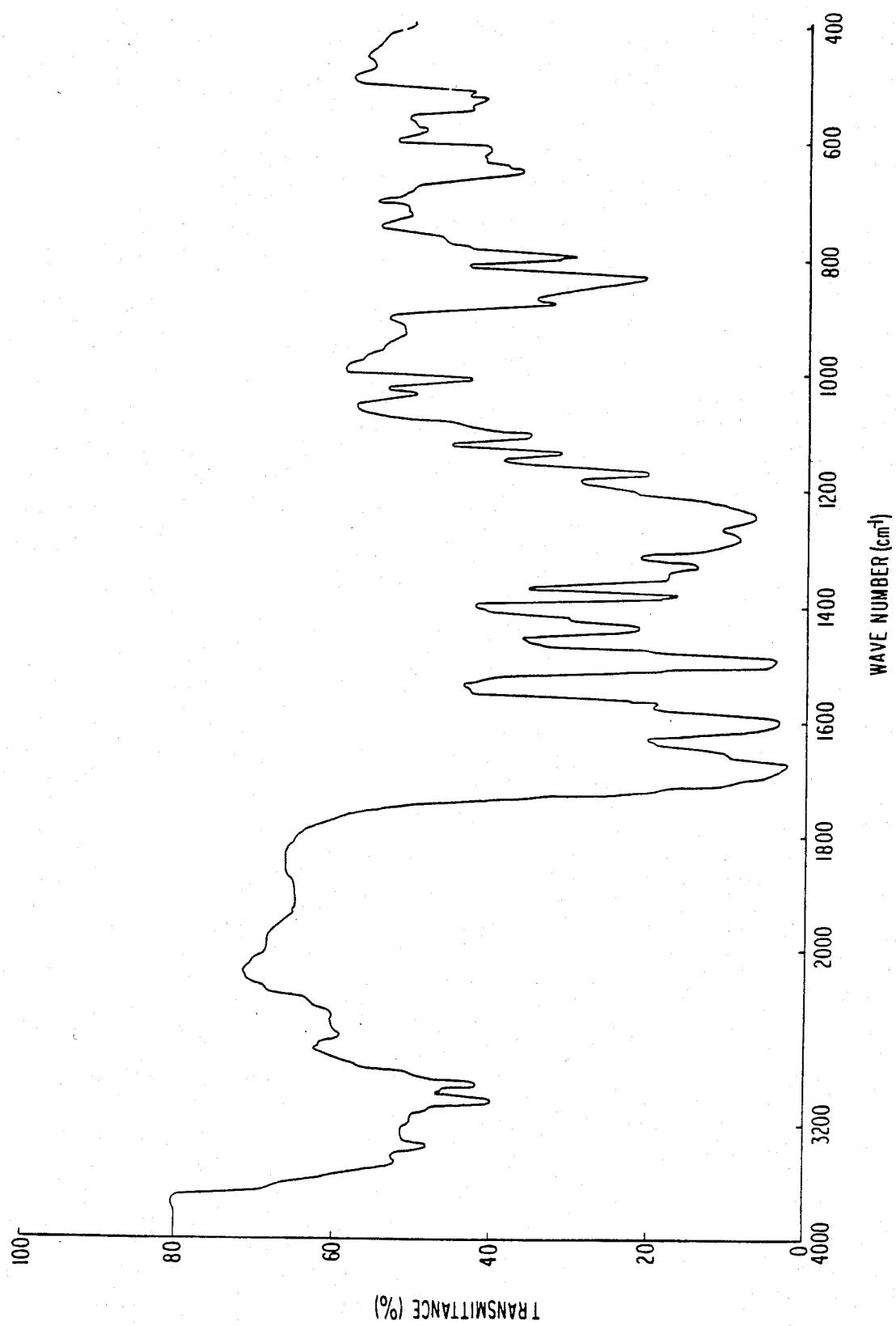

An infrared spectrum of the polyquinazolone is shown in FIG. 2.

In the same manner as in Example 8, a dope was prepared and formed into a permeable membrane. Its thickness, salt rejection, and water permeation rate were, respectively, 115 μ, 98.3% and 0.40 m³/m².

EXAMPLE 11

A mixture of 100 parts by mol of the same compound of formula (II) as used in Example 8, 80 parts by mol of 4,4'-diaminodiphenylmethane and 20 parts by mol of 3,5-diaminobenzenesulfonic acid was dissolved in p-cresol and reacted in the same manner as in Example 1 to obtain polyquinazolone having an intrinsic viscosity of 0.63 and consisting of 80 mol % of the bisquinazolone unit

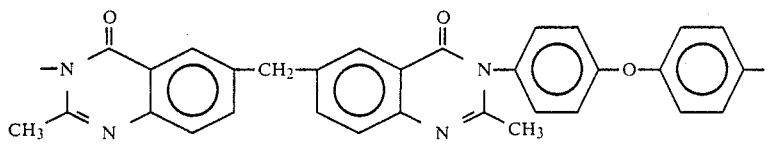

and 20 mol % of the repeating unit

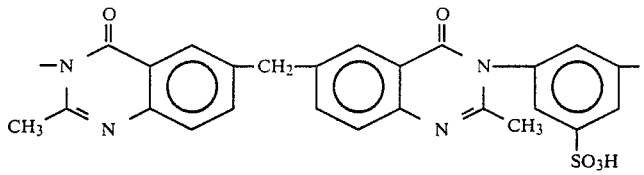

The thickness, salt rejection, and water permeation rate of the permeable membrane obtained from the above-prepared polyquinazolone in the same manner as in Example 8 were, respectively, 126 μ, 91.1% and 0.89 m³/m². day.

EXAMPLE 12

A mixture of 100 parts by mol of the same compound of formula (II) as used in Example 8, 80 parts by mol of 4,4'-diamino diphenyl ether and 20 parts by mol of 4,4'-diaminodiphenylmethane-3,3'-dicarboxylic acid was dissolved in o-cresol and processed in the same manner as in Example 9 to obtain polyquinazolone having an intrinsic viscosity of 0.85. This polyquinazolone consisted of 80 mol % of the former bisquinazolone unit as shown in Example 9 and 20 mol % of the latter repeating unit.

A dope was prepared from the above obtained polyquinazolone in the same manner as in Example 8, coated on a glass plate, heat-treated at 80° C. for 2 minutes in a hot air drying chamber and then immersed in acetone (immersing solvent) for 15 seconds. After being taken out of the immersing solvent, the dope-coated glass plate was immediately placed in cold water at 1° C. and immersed for 3 hours.

The thus-obtained 184 μ thick permeable membrane was evaluated in membrane performance by using a 0.5% (by weight) aqueous solution of polyethylene glycol having an average molecular weight of about 2,000, under the conditions of a temperature of 25° C. and an operation pressure of 10 kg/cm², and it was found that the polyethylene glycol salt rejection and the water permeation rate were respectively 94.8% and 1.5 m³/m².day.

EXAMPLE 13

A mixture of 100 parts by mol of the same compound of formula (II) as used in Example 8, 90 parts by mol of 4,4'-diamino diphenyl ether and 10 parts by mol of 3,5-diaminobenzoic acid was reacted in p-cresol in the same manner as in Example 9 to obtain polyquinazolone having an intrinsic viscosity of 0.97. This polyquinazolone consisted of 90 mol % of the bisquinazolone unit as shown in Example 8 and 10 mol % of the latter repeating unit.

The above-prepared polyquinazolone was dissolved in N-methyl-2-pyrrolidone, and diethylene glycol was then added thereto in an amount of 60 parts by weight per 100 parts by weight of the polyquinazolone to prepare a dope. This dope was coated in a thickness of 360 μ on a glass plate and without being subjected to heat-treatment, placed immediately in cold water at 1° C. and immersed therein for 2 hours. To a 193 μ thick permeable membrane obtained by stripping from the above glass plate, a 0.5% (by weight) aqueous solution of polyethylene glycol having an average molecular weight of 20,000 was supplied, under the conditions of a temperature of 25° C. and a pressure of 4 kg/cm², and it was found that the polyethylene glycol salt rejection and water permeation rate were, respectively, 98.8% and 1.9 m³/m².day.

EXAMPLE 14

The permeable membranes as obtained in Examples 8, 9 and 10 were each immersed in an alkaline aqueous solution adjusted to pH 11, at a temperature of 50° C., for 7 days, and the membrane performance was then evaluated. As can be seen from the results shown in Table 4, the alkali immersion caused almost no change in the membrane performance. Similarly, the permeable membranes were each immersed in an acidic aqueous solution adjusted to pH 1, but almost no change in the membrane performance was observed. It can, thus, be seen that the permeable membranes of this invention are excellent in alkali resistance and acid resistance.

The above three permeable membranes were each immersed in an aqueous solution of sodium hypochlorite having an effective chlorine concentration of 800 ppm, at a temperature of 25° C., for 24 hours and, thereafter, the membrane performance was evaluated. The results are shown in Table 4. It can be seen that after the immersion in the high concentrated chlorine liquor, almost no reduction in the membrane performance was observed and the polyquinazolone membranes of this invention are excellent in chlorine resistance.

TABLE 4

| Permeation Membrane | After Immersion in Alkaline Aqueous Solution | | After Immersion in Chlorine Liquor | |
|---|---|---|---|---|
| | Salt Rejection (%) | Water Permeation Rate (m³/m².day) | Salt Rejection (%) | Water Permeation Rate (m³/m².day) |
| Membrane of Example 8 | 97.0 | 0.48 | 97.2 | 0.45 |
| Membrane of Example 9 | 98.2 | 0.22 | 97.9 | 0.21 |
| Membrane of Example 10 | 98.1 | 0.38 | 97.8 | 0.32 |

While the invention has been described in detail and with reference to specific embodiment thereof, it will be apparent to one skilled in the art that various changes and modifications can be made therein without departing from the spirit and scope thereof.

What is claimed is:

1. A selective permeable membrane comprising a polyquinazolone-based polymer having a repeating unit (Ia) represented by the formula

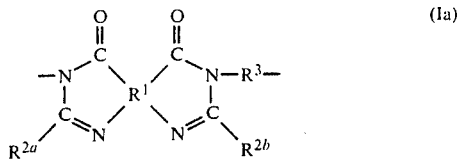 (Ia)

wherein $R^1$ is a tetravalent aromatic group, $R^{2a}$ and $R^{2b}$ are each independently an alkyl group or aromatic group, and $R^3$ is a divalent organic group, and a repeating unit (Ib) represented by the formula

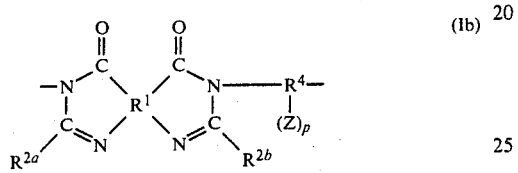 (Ib)

wherein $R^1$, $R^{2a}$ and $R^{2b}$ have the same meanings as defined above, $R^4$ is an aromatic group having a (p+2) valency, each Z is independently selected from the group consisting of COOH, —SO$_3$H or a metal salt thereof, and p is an integer of from 1 to 4.

2. A selective permeable membrane as in claim 1 wherein $R^1$ is selected from the groups represented by the formulae

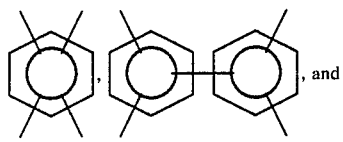

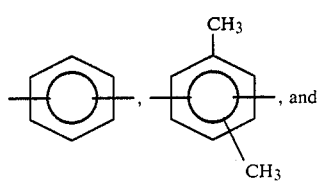

wherein Y is a divalent organic linking group, and $R^4$ is selected from the groups represented by the formulae

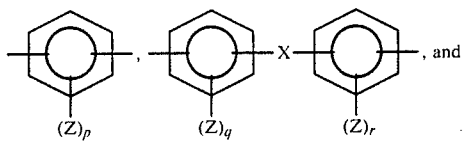

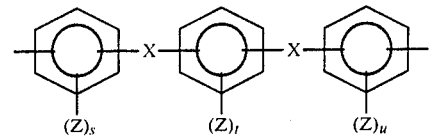

wherein X is a divalent organic linking group, Z is —COOH, —SO$_3$H, or a metal salt thereof, and p is an integer of from 1 to 4, q, r, s, t and u are each an integer of from 0 to 4, and q+4=p and s+t+u=p.

3. The selective permeable membrane as in claim 1 wherein $R^1$ is a group represented by the formula

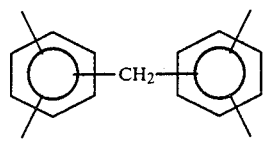

$R^{2a}$ and $R^{2b}$ are each independently a methyl group or a phenyl group, $R^3$ is a group represented by the formulae

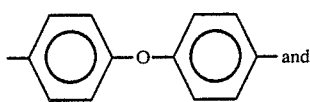

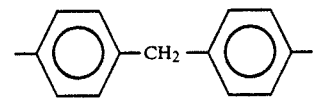

and $R^4$ is selected from the groups represented by the formulae

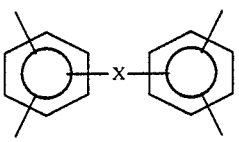 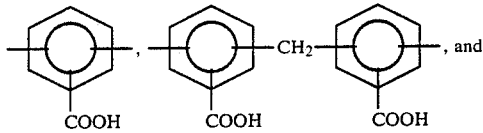

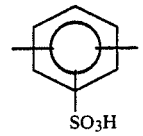

or a metal salt thereof.

4. A selective permeable membrane as in claim 1 wherein the unit (Ib) constitutes 70 mol % or less of the total of the units (Ia) and (Ib).

5. A selective permeable membrane as in claim 4 wherein the unit (Ib) constitutes from 5 to 60 mol % of the total of the units (Ia) and (Ib).

6. A selective permeable membrane as in claim 3 wherein the unit (Ib) constitutes 70 mol % or less of the total of the units (Ia) and (Ib).

7. A selective permeable membrane as in claim 6 wherein the unit (Ib) constitutes from 5 to 60 mol % of the total of the units (Ia) and (Ib).